Sept. 27, 1960        E. V. SUNDT        2,953,934
MECHANISM FOR OPERATING TELESCOPIC ANTENNAS OR THE LIKE
Filed April 28, 1958        2 Sheets-Sheet 2
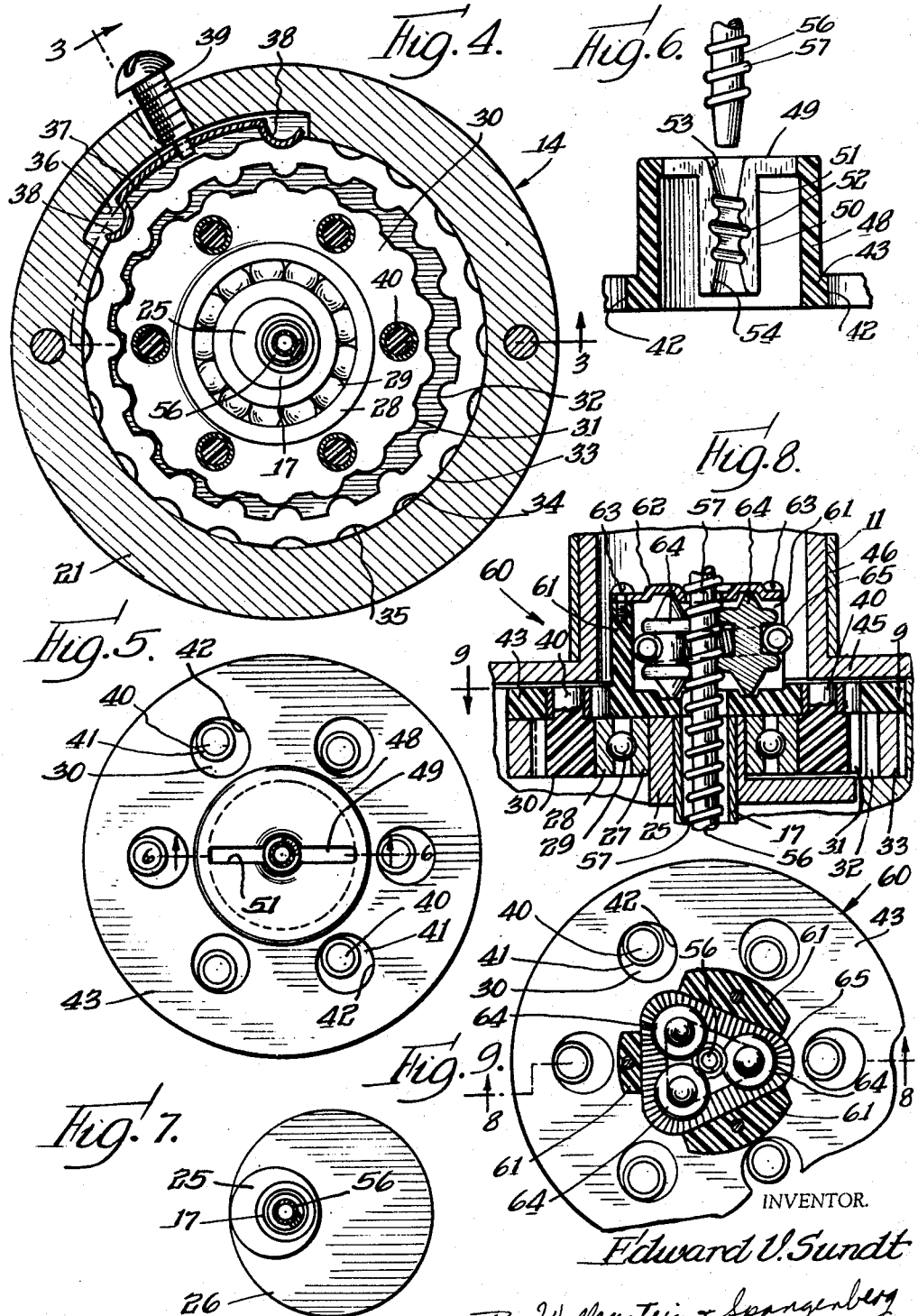
INVENTOR.
Edward V. Sundt
By Wallenstein & Spangenberg
Attys ved Sept. 27, 1960

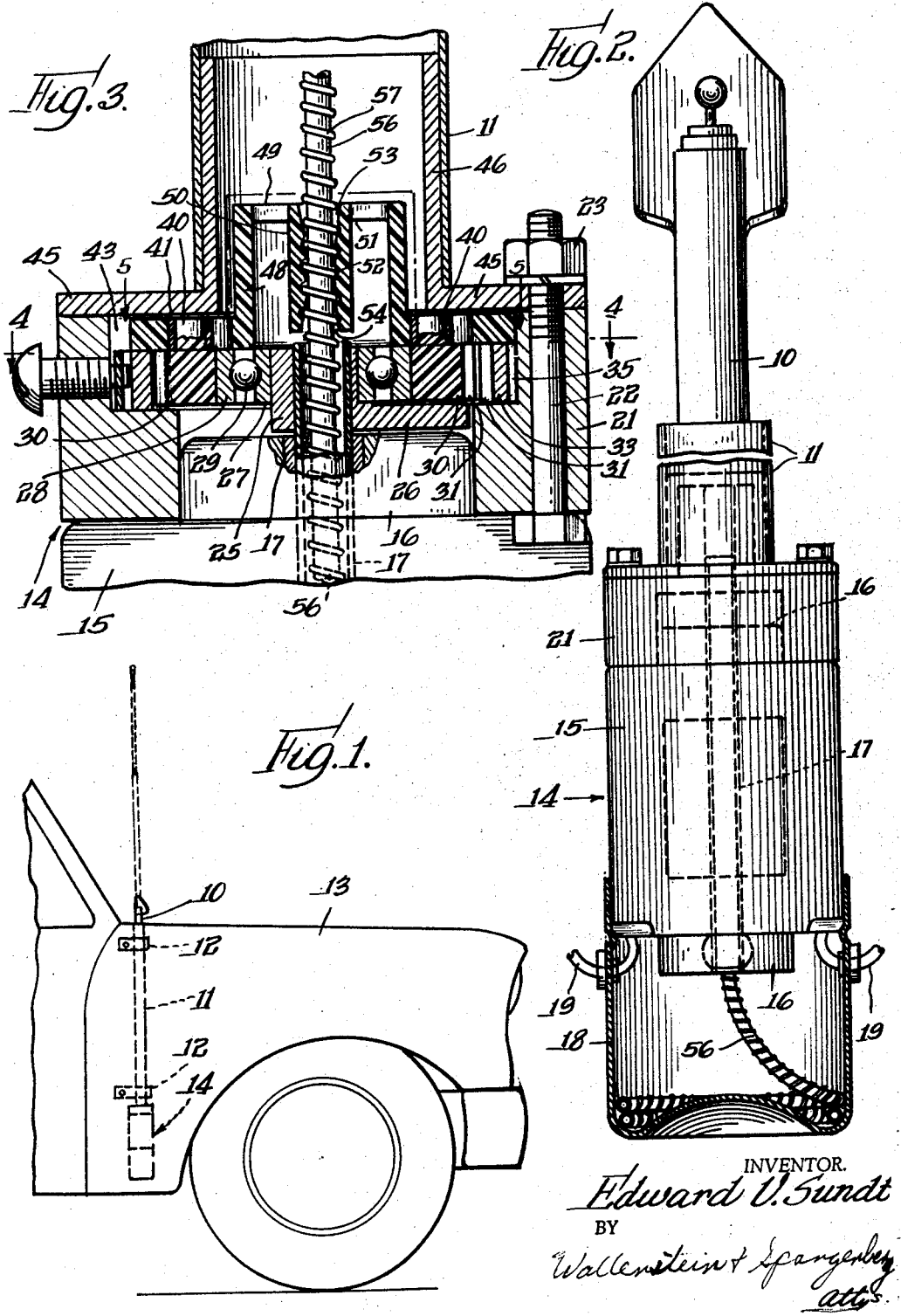

United States Patent Office 2,953,934
Patented Sept. 27, 1960

2,953,934

MECHANISM FOR OPERATING TELESCOPIC ANTENNAS OR THE LIKE

Edward Victor Sundt, 118 Sterling Lane, Wilmette, Ill.

Filed Apr. 28, 1958, Ser. No. 731,535

6 Claims. (Cl. 74—424.8)

The principal object of this invention is to provide a new and improved mechanism for operating devices in the automotive or similar fields, such as telescopic antenna, windows or other devices, which is simple and rugged in construction, which is inexpensive to manufacture and assemble, and which is foolproof and safe in operation.

Briefly, the operating mechanism comprises a reversible electric motor having a hollow rotating shaft, and a differential gear reducer at one end of the motor concentric with the shaft and which includes a driving member carried by the shaft and a driven member rotated at a reduced speed thereby. A nut is carried by the driven member concentric with the motor shaft, and a flexible wire-like operating member, having an external helical thread, extends through the hollow motor shaft and the concentric differential gear reducer and threadedly engages the nut, so as to be advanced and retracted as the nut is rotated at reduced speed in one direction or the other by the reversible motor. The flexible wire-like operating member may extend to the telescopic antenna or the like for operating the same.

There is thus provided a compact and uniformly concentric operating mechanism which may be readily mounted in a minimum of space. By utilizing the gear reducer for rotating the nut at reduced speed, relatively low speeds are encountered at the running surfaces between the nut and the flexible wire-like operating member, which provides for longer life and better operation and which permits the use of a helical thread of large lead on the operating member for inexpensive manufacture.

Preferably, a container is concentrically located at the other end of the motor which receives the flexible wire-like operating member in a coil therein when the flexible wire-like operating member is retracted. This also aids in providing a compact structure. The nut is preferably made resiliently expandable to allow the flexible wire-like operating member to be manually moved longitudinally with respect to the nut. This allows manual overpowering of the operating mechanism so that the telescopic antenna or the like may be manually manipulated, if desired. The nut also has provision for requiring more manual force to advance the telescopic antenna or the like than to retract it, which is of particular importance where children may be prone to tamper with the telescopic antenna or the like.

An overload release mechanism is also preferably provided for the gear reducer to allow the motor shaft to continue to rotate if the force resisting rotation of the nut exceeds a predetermined value. This is of importance in as much as it prevents the motor from burning out, if the motor is inadvertently energized when the telescopic antenna or the like is in either extreme position or is jammed against operation.

Further objects of this invention reside in the details of construction of the operating mechanism and in the cooperative relationships between the component parts thereof.

Other objects and advantages of this invention will become apparent to those skilled in the art upon reference to the accompanying specification, claims and drawings in which:

Fig. 1 is an elevational view of a portion of an automotive vehicle illustrating a telescopic antenna and the operating mechanism of this invention applied thereto.

Fig. 2 is an enlarged elevational view of the telephonic antenna and the operating mechanism therefor.

Fig. 3 is a vertical sectional view through the operating mechanism taken substantially along the line 3—3 of Fig. 4.

Fig. 4 is a horizontal sectional view taken substantially along the line 4—4 of Fig. 3.

Fig. 5 is a plan view of the driven member and nut of the operating mechanism which is taken substantially along the line 5—5 of Fig. 3.

Fig. 6 is a vertical sectional view through the nut taken substantially along the line 6—6 of Fig. 5.

Fig. 7 is a plan view of the eccentric carried by the motor shaft.

Fig. 8 is a vertical sectional view similar to Fig. 3 but illustrating another form of nut carried by the driven member of the operating mechanism, and is taken substantially along the line 8—8 of Fig. 9.

Fig. 9 is a horizontal sectional view taken substantially along the line 9—9 of Fig. 8.

Referring first to Fig. 1, the operating mechanism of this invention is illustrated for operating a telescopic antenna 10, the antenna 10 being supported by a tube 11 which is secured by brackets 12 within the fender of an automotive vehicle 13. The operating mechanism of this invention for operating the antenna 10 is designated at 14 and is carried by the lower end of the tube 11. The operating mechanism 14 operates to advance and retract the telescopic antenna 10.

The operating mechanism 14 is illustrated in more detail in Figs. 2 to 7. It includes a reversible electric motor 15 having conventional stator and armature structures for rotating a hollow shaft 17 which is journaled for rotation in suitable bearings in the bells 16 of the motor 15. The lower end of the motor 15 carries a container 18 and conductors 19 may extend through grommets in the container 18 to the motor 15 for supplying electrical energy thereto from the usual electrical energy source of the automotive vehicle. The motor 15 is a reversible motor and is rotated in either direction at substantially 6000 r.p.m. when loaded.

A gear head 21 is secured to the other end of the motor 15 by means of the usual tie rods 22 and nuts 23 and preferably the gear head 21 is formed from a thermosetting plastic material such as a mixture of phenolic and fiber glass or the like. Arranged within the gear head 21 and secured to the hollow shaft 17 is a driving member in the form of an eccentric 25 having a counterbalance portion 26, the eccentric 25 and counterbalance 26 being preferably formed of powdered iron or the like. The inner race 27 of a ball bearing is secured to the eccentric 25, the ball bearing having an outer race 28 separated from the inner race by balls 29. Secured to the outer race 28 of the ball bearing is a rotor or oscillating member 30 which is preferably formed of nylon or the like. This oscillating member 30 is provided with external teeth 31 which are in mesh with internal teeth 32 on a gear member 33 which is preferably formed of powdered iron or the like. The gear member 33 is rotatably mounted in an annular recess 34 in the gear head 21 but it is normally held against rotation. The teeth 31 on the oscillating member 30 are preferably 18 in number while the teeth 32 on the gear member are preferably 20 in number. As the oscillating member 30 is oscillated by the eccentric 25, upon which it is rotatably mounted by the ball bearing, the oscillating member 30 oscillates within the gear member 33 with their respective teeth meshing. Since the gear member 33 is normally secured against rotation, it operates as a reaction gear for the oscillating member 30 so as to provide gear reduction of substantially 9 to 1, and as a result, the oscillating member 30 is rotated at a speed of substantially 666 r.p.m. by the motor shaft 17 operating at a speed of substantially 6000 r.p.m. The oscillating member 30 is so rotated at reduced speed in one direction or the other dependent upon the direction of rotation on the motor shaft 17 of the reversible motor 15.

The outer edge of the gear member 33 is provided with notches 35 which form a part of an overload release or detent mechanism. The gear head 21 is provided with a recess 36 in which is mounted a spring member 37 having a pair of fingers 38 engaging in the notches 35, the tension of the spring member 37 being adjusted by a screw 39 screwthreadedly mounted in the gear head 21. The fingers 38 of the spring arm 37 cooperate with the notches 35 and normally secure the gear member 32 against rotation. If, however, the turning force of the gear member 33 exceeds a predetermined value as determined by the spring member 37, the gear member 33 is then permitted to rotate in the gear head 21 with the notches 35 running past the fingers 38. When this occurs, a clicking sound is produced to audibly indicate the slipping.

The oscillating member 30 is provided with a plurality of pins 40 in the form of projections thereon which rotatably carry steel sleeves 41. The steel sleeves 41 are received in holes 42 in a driven member 43 which is rotatably mounted in the gear head 21 concentric with the motor shaft 17, the driven member 43 being formed of a suitable plastic material, such as nylon containing substantially 30% glass fiber fill. The holes 42 in the driven member 43 are sized with respect to the sleeves 41 and the eccentricity of the eccentric 25 so that the oscillating and rotation motion of the oscillating member 30 is transmitted to the driven member 43 so as to rotate the latter concentrically with the motor shaft 17. In this way, the driven member is concentrically rotated at the aforementioned reduced speed.

A cover overlies the driven member 43 and is secured in place by the tie bolts 22 and nuts 23 on the gear head 21. The cover 45 is preferably formed by die-casting and is provided with a tubular extension 46 which is suitably secured to the supporting tube 11.

The driven member 43 is provided with a tubular portion 48, an end wall portion 49 and a re-entrant portion 50, forming a nut, the end wall portion 49 and the re-entrant portion 50 of the nut being provided with a slot 51. The re-entrant portion 50 is centrally provided with threads 52 and with tapered end bores 53 and 54, as illustrated more clearly in Fig. 6. A flexible wire-like opening member 56 provided with a helical thread 57 extends through the hollow motor shaft 17 and the differential gear reduced and is threaded in the threads 52 of the re-entrant portion 50 of the nut carried by the driving member 43. Thus, as the driving member 43 is rotated at reduced speeds, the nut carried thereby is correspondingly rotated to advance and retract the flexible wire-like operating member 56 depending upon the direction of rotation of the motor shaft 17. The flexible wire-like operating member 56 may be formed of a steel flexible cable or the like and the helical thread 57 may be formed by a wire which is suitably secured to the cable as by brazing or the like. The lead of the helical thread 57 may be large, for example 10 turns per inch.

The lower end of the flexible wire-like operating member 56 is received as a coil in the container 18 when it is retracted. The other end of the flexible wire-like operating member is suitably connected to the telescopic antenna 10 to advance and retract the same as the reversible electric motor is operated.

Because the nut carried by the driven member 43 is formed of a resilient material and is slotted at 51 and because the re-entrant portion 50 of the nut is provided with tapered bores at its ends the flexible wire-like operating member 56 may be manually advanced and retracted with respect to the nut. When this is done, the re-entrant portion 50 of the nut resiliently expands to allow the helical thread 57 on the operating member 56 to pass the threads 52 in the re-entrant portion. By selecting the angles of the tapered bores 53 and 54, the amount of manual force required to manually move the operating member 56 with respect to the re-entrant portion 50 of the nut may be predetermined, as for example, a manual force of 4 or 5 pounds may be required to manually retract the operating member 56 while a force of substantially 20 pounds may be required to manually advance the operating member 56. This differential of forces required to advance or retract the operating member 56 is also brought about by the slotted re-entry portion 50 and the slotted end wall portion 49, it being easier to resiliently expand the re-entry portion 50 when the operating member 56 is retracted than when it is advanced. In other words, in advancing the operating member 56 the re-entry portion 50 of the nut has a tendency to tighten somewhat while in the retracting direction the tendency is to open or loosen. These tendencies may be regulated by proper selection of the angles of the tapered bores 53 and 54.

Another form of the operating mechanism of this invention is generally designated at 60 in Figs. 8 and 9. The operating mechanism 60 in most respects may be similar to the operating mechanism 14 described above and, accordingly, like reference characters have been utilized for like parts. The essential difference between the operating mechanisms 60 and 14 resides in the construction of the nut carried by the driven member 43. Here, the driven member 43 carries three posts 61 which in turn carry a cap 62 by means of screws 63. Arranged between the driven member 43 and the cap 62 and within the posts 61 are three grooved rollers 64 which are resiliently held against the flexible wire-like operating member 56 by means of a garter spring 65. The rollers 64 are held against endwise movement between the driven member 43 and the cap 62 so that as the driven member 43 is rotated, at reduced speed, the grooved rollers 64 operate as a nut for advancing and retracting the operating member 56. Because the grooved rolls 64 are resiliently held against the operating member 56 by the garter spring 65, the helical thread 57 on the operating member 56 may be manually advanced and retracted with respect to the rollers 64 of the nut, this being provided by the rollers moving radially outwardly against the action of the spring 65.

Both forms of the operating mechanism of this invention operate in substantially the same way. As the motor 15 is operated to rotate the motor shaft 17 in one direction or the other, the differential gear reducer operates to rotate at reduced speeds the nut carried by the driven member of the gear reducer to advance and retract the flexible wire-like operating member for advancing and retracting the telescopic antenna. If the motor operation is continued after the operating member 56 reaches either extreme position or if the motor is operated when the operating member 56 is jammed against movement, the force resisting rotation of the nut would then exceed a predetermined value, and when this occurs, the gear member 33 would slip with respect to the gear head 21. Thus, the motor cannot be stalled, but will continue to rotate. As a result, burning out of the motor is prevented under these conditions. When slipping so occurs an audible clicking noise is provided to acquaint the operator of the operating mechanism of this fact. Also, in both forms of the invention provision is made, by means of the resiliently expandable nut, to manually advance and retract the operating member 56 and in the form of the invention illustrated in Figs. 1 to 7 more manual force may be required to advance the operating member 56 than to retract the same. Because all of the parts of the operating mechanism are concentrically arranged about the axis of the motor shaft, an extremely compact operating mechanism is provided which requires minimum space and which provides for ease in mounting.

While for purposes of illustration, two forms of this invention have been disclosed, other forms thereof may become apparent to those skilled in the art upon reference to these disclosures and, therefore, this invention is to be limited only by the scope of the appended claims.

I claim as my invention:

1. In a mechanism for operating a telescopic antenna or the like, a reversible motor having a hollow rotating shaft, a differential gear reducer at one end of the motor concentric with the motor shaft and including a driving member carried by the motor shaft and a driven member rotated at a reduced speed thereby, a nut carried by the driven member concentric with the motor shaft, and a flexible, wire-like operating member having an external helical thread extending through the hollow motor shaft and the concentric differential gear reducer and threadedly engaging the nut to be advanced and retracted as the nut is rotated at reduced speed in one direction or the opposite direction by the reversible motor, said nut being resiliently expandable and being provided with means to allow the flexible wire-like operating member to be manually longitudinally advanced by the application of a predetermined manual force thereto and to be manually longitudinally retracted by the application of lesser predetermined manual force thereto.

2. In a mechanism for operating a telescopic antenna or the like, a reversible motor having a hollow rotating shaft, a differential gear reducer at one end of the motor concentric with the motor shaft and including a driving member carried by the motor shaft and a driven member rotated at a reduced speed thereby, a nut carried by the driven member concentric with the motor shaft and a flexible wire-like operating member having an external helical thread extending through the hollow motor shaft and the concentric differential gear reducer and threadedly engaging the nut to be advanced and retracted as the nut is rotated at reduced speed in one direction or the opposite direction by the reversible motor, said nut being formed of resilient material, being split and being provided with differently tapered bores at its ends to allow the flexible wire-like operating member to be manually longitudinally advanced by the application of a predetermined manual force thereto and to be manually longitudinally retracted by the application of lesser predetermined manual force thereto.

3. In a mechanism for operating a telescopic antenna or the like, a reversible motor having a hollow rotating shaft, a differential gear reducer at one end of the motor concentric with the motor shaft and including a driving member carried by the motor shaft and a driven member rotated at a reduced speed thereby, a nut carried by the driven member concentric with the motor shaft, and a flexible wire-like operating member having an external helical thread extending through the hollow motor shaft and the concentric differential gear reducer and threadedly engaging the nut to be advanced and retracted as the nut is rotated at reduced speed in one direction or the opposite direction by the reversible motor, said nut comprising a plurality of grooved rolls and spring means for resiliently holding the rolls in contact with the flexible wire-like operating member to allow the flexible wire-like operating member to be manually moved longitudinally with respect to the rolls of the nut.

4. In a mechanism for operating a telescopic antenna or the like, a reversible motor having a rotating shaft, a gear reducer including a driving member carried by the motor shaft and a driven member rotated at reduced speed thereby, a nut carried by the driven member, and a flexible wire-like operating member having an external thread threadedly engaging the nut to be advanced and retracted as the nut is rotated at reduced speed in one direction or the opposite direction by the reversible motor, said nut being resiliently expandable and being provided with means to allow the flexible wire-like operating member to be manually longitudinally advanced by the application of a predetermined manual force thereto and to be manually longitudinally retracted by the application of lesser predetermined manual force thereto.

5. In a mechanism for operating a telescopic antenna or the like, a reversible motor having a rotating shaft, a gear reducer including a driving member carried by the motor shaft and a driven member rotated at reduced speed thereby, a nut carried by the driven member, and a flexible wire-like operating member having an external thread threadedly engaging the nut to be advanced and retracted as the nut is rotated at reduced speed in one direction or the opposite direction by the reversible motor, said nut being formed of resilient material, being split and being provided with differently tapered bores at its ends to allow the flexible wire-like operating member to be manually longitudinally advanced by the application of a predetermined manual force thereto and to be manually longitudinally retracted by the application of lesser predetermined manual force thereto.

6. In a mechanism for operating a telescopic antenna or the like, a reversible motor having a rotating shaft, a gear reducer including a driving member carried by the motor shaft and a driven member rotated at reduced speed thereby, a nut carried by the driven member, and a flexible wire-like operating member having an external thread threadedly engaging the nut to be advanced and retracted as the nut is rotated at reduced speed in one direction or the opposite direction by the reversible motor, said nut comprising a plurality of grooved rolls and spring means for resiliently holding the rolls in contact with the flexible wire-like operating member to allow the flexible wire-like operating member to be manually moved longitudinally with respect to the rolls of the nut.

References Cited in the file of this patent

UNITED STATES PATENTS

| | | |
|---|---|---|
| 1,799,348 | Apple | Apr. 7, 1931 |
| 2,299,785 | Barrett | Oct. 27, 1942 |
| 2,346,728 | Carlson | Apr. 18, 1944 |
| 2,475,504 | Jackson | July 5, 1949 |
| 2,580,889 | Carlson | Jan. 1, 1952 |
| 2,701,478 | Riess | Feb. 8, 1955 |
| 2,795,304 | Marion | June 11, 1957 |